US007711119B2

(12) United States Patent
Brett et al.

(10) Patent No.: US 7,711,119 B2
(45) Date of Patent: May 4, 2010

(54) METHOD AND APPARATUS FOR TRANSITION OF ENCRYPTION KEY DURING AN ONGOING MEDIA COMMUNICATION SESSION

(75) Inventors: Brendan Brett, San Diego, CA (US); Maria Marshall, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 897 days.

(21) Appl. No.: 10/856,928

(22) Filed: May 27, 2004

(65) Prior Publication Data

US 2005/0276415 A1   Dec. 15, 2005

(51) Int. Cl.
*H04L 29/06* (2006.01)
*H04L 9/00* (2006.01)
*H04K 1/00* (2006.01)

(52) U.S. Cl. .................. 380/273; 380/260; 380/277; 713/150

(58) Field of Classification Search .......... 380/260, 380/273, 277; 713/150
See application file for complete search history.

(56) References Cited

U.S. PATENT DOCUMENTS

| 5,018,197 A * | 5/1991 | Jones et al. ............... 380/239 |
| 5,404,403 A | 4/1995 | Bright et al. ............... 380/21 |
| 5,404,404 A | 4/1995 | Novorita ................... 380/21 |
| 5,412,722 A | 5/1995 | Sherly et al. .............. 380/21 |
| 6,590,981 B2 * | 7/2003 | Fruehauf et al. .......... 380/260 |
| 6,603,857 B1 * | 8/2003 | Batten-Carew et al. ..... 380/44 |
| 6,870,932 B2 * | 3/2005 | Jiang ........................ 380/273 |
| 2004/0064688 A1 * | 4/2004 | Jacobs ...................... 713/150 |

FOREIGN PATENT DOCUMENTS

EP    0898260 A1    2/1999

OTHER PUBLICATIONS

International Search Report, PCT/US2005/012068, Aug. 26, 2005.
Written Opinion of the International Searching Authority, PCT/US2005/012068.
International Preliminary Report on Patentability, PCT/US2005/012068, Nov. 22, 2006.

* cited by examiner

*Primary Examiner*—Kambiz Zand
*Assistant Examiner*—Benjamin A Kaplan
(74) *Attorney, Agent, or Firm*—Abdollah Katbab; Won Tae C. Kim

(57) ABSTRACT

The disclosed embodiments provide for methods and apparatus for encrypting media using a current media encryption key (MEK), requesting a new MEK, and receiving the new MEK. The method further provides for transitioning from the current MEK to the new MEK and continuing to encrypt the media using the new MEK. In another embodiment, the method provides for decrypting media during an ongoing media communication session, the method provides for receiving encrypted media, and decrypting the encrypted media using a current MEK. The method further provides for requesting a new MEK before the current MEK expires based on its associated expiration time, receiving the new MEK, and continuing to decrypt the encrypted media based on a received MEK indication flag (MIF) that indicates whether the encrypted media is encrypted using the current MEK or the new MEK.

20 Claims, 6 Drawing Sheets

METHOD AND APPARATUS FOR TRANSITION OF ENCRYPTION KEY DURING AN ONGOING MEDIA COMMUNICATION SESSION

FIELD

The present invention relates to point-to-point, point-to-multi-point, and broadcast communications systems. More specifically, the present invention relates to methods and apparatus for distributing encryption keys during a secure media communication session in a communication network.

BACKGROUND

A class of wireless services intended for quick, efficient, one-to-one or one-to-many (group) communication has existed in various forms for many years. In general, these services have been half-duplex, where a user presses a "push-to-talk" (PTT) button on a phone/radio to initiate a group communication. These services have traditionally been used in applications where one person needs to communicate with a group of people, such as field service personnel or taxi drivers, generally known as group communication services.

For a secure media communication, media is encrypted using media encryption key (MEK) before being communicated to targets, and decrypted after being received at the targets using the same MEK. Each MEK includes a time-to-live value which upon its expiration the MEK may expire and be no longer valid. When a current MEK expires during an ongoing media communication session, a new MEK is obtained and used to encrypt the subsequent media. However, since the participants of the ongoing communication session may not all receive the new MEK at precisely the same time, the transition to the new MEK may cause some media packets be decrypted with a wrong MEK; thus, negatively impacting the encryption and/or decryption of the media stream.

There is a need, therefore, for mechanisms to dynamically transition from a current MEK to a new MEK during an ongoing media communication session without negatively impacting the encryption and/or decryption of the media stream or loss of media packets.

SUMMARY

The disclosed embodiments provide novel and improved methods and apparatus for transitioning encryption keys during an ongoing media communication session. In one aspect, the method provides for: encrypting media using a current media encryption key (MEK), requesting a new MEK before the current MEK expires, and receiving the new MEK. The method further provides for transitioning from the current MEK to the new MEK and continuing to encrypt media using the new MEK.

In another aspect, the method provides for decrypting media during an ongoing wireless media communication session, the method including receiving encrypted media, and decrypting the encrypted media using a current media encryption key (MEK). The method further includes requesting a new MEK before the current MEK expires, receiving the new MEK, and continuing with decrypting the encrypted media based on a received MEK indication flag (MIF) that indicates whether the encrypted media is encrypted using the current MEK or the new MEK.

In one aspect, an apparatus for transitioning media communication keys during an ongoing wireless communication session includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description of the embodiments set forth below.

DETAILED DESCRIPTION

Figure 1:
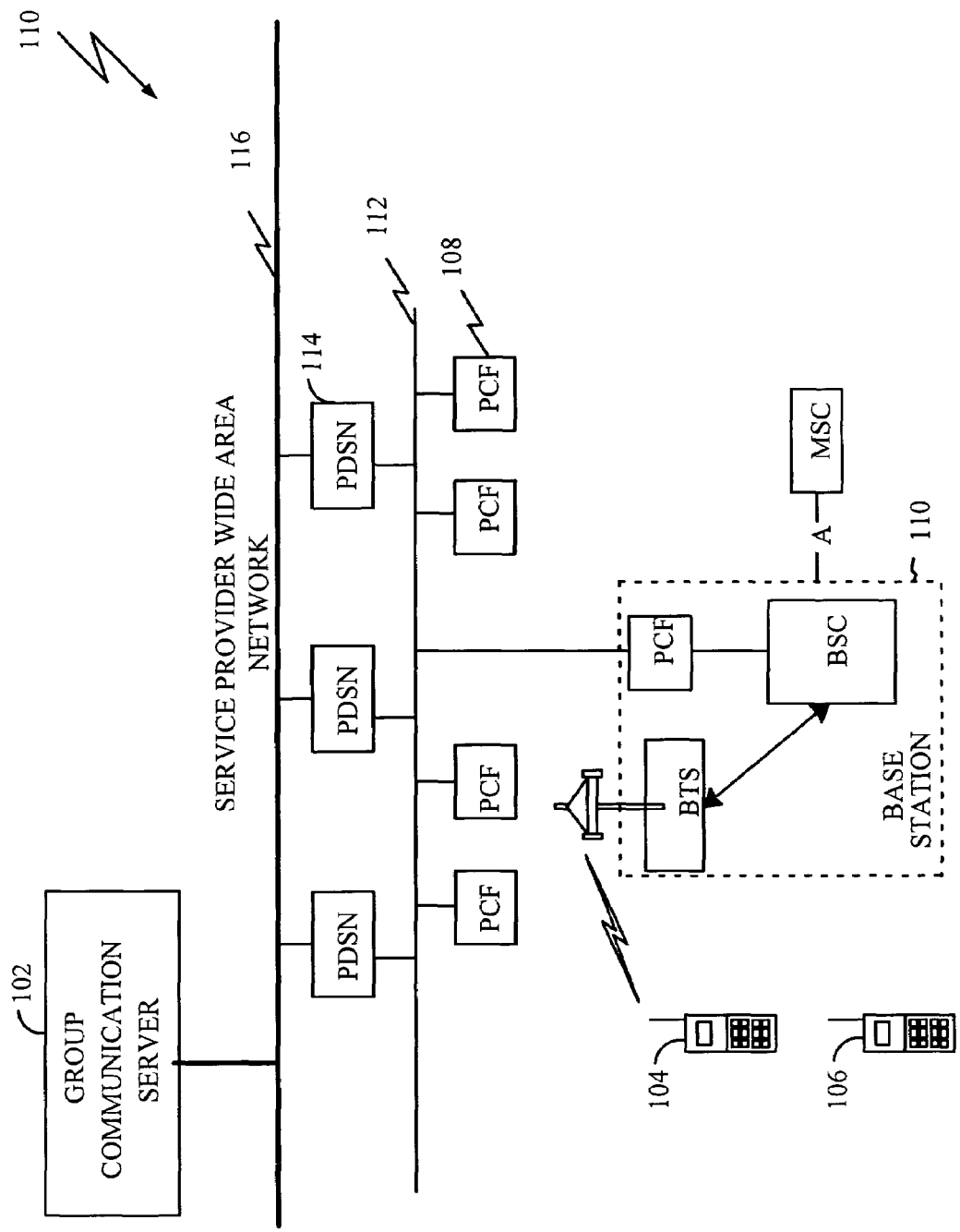
FIG. 1 illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a functional block diagram of a group communication system 100, for implementing one embodiment. Group communication system 100 is also known as a push-to-talk (PTT) system, a net broadcast service (NBS), a dispatch system, or a point-to-multi-point communication system. In one embodiment, group communication system 100 includes a group communication server (GCS) 102, which may be deployed in either a centralized deployment or a regionalized deployment. Group communication server 102 may be implemented as known in the art, including one or more processor, one or more memory units, and input/out hardware and software modules for various media communications, e.g., IP media communication.

Group communication devices (CDs) 104 and 106, which may be deployed such as CDMA (e.g., cdma2000) handsets, for example, may request packet data sessions using a data service option. Each CD may use the session to register its Internet protocol (IP) address with the group communication server to perform group communication initiations. In one embodiment, group communication server 102 is connected to the service provider's packet data service nodes (PDSNs) through service provider's network 116. CDs 104 and 106, upon requesting packet data sessions from the wireless infrastructure, may have IP connectivity to group communication server 102 through the PDSNs 114. Each PDSN may interface to a base station controller (BSC) through a packet control function (PCF) 108 and a network 112. The PCF may be co-located with the BSC within a base station (BS) 110.

A packet data service node may fall in one of several states, e.g., active or connected state, dormant state, and null or inactive state. In the active or connected state, an active traffic channel exists between the participating CD and the BS or BSC, and either side may send data. In the dormant state, no active traffic channel exists between the participating CD and the BSC, but a point-to-point protocol (PPP) link is maintained between the participating CD and the PDSN. In the null or inactive state, there is no active traffic channel between the participating CD and the BSC, and no PPP link is maintained between the participating CD and the PDSN.

Each one of CDs 104 and 106 may request packet data sessions. As part of establishing a packet data session, each CD may be assigned an IP address. Each CD may perform a registration process to notify group communication server 102 of the CD's IP address. Registration may be performed using an IP protocol, such as session initiation protocol (SIP) over user datagram protocol (UDP). The IP address of a CD may be used to contact the CD when the corresponding user is invited into or informed of a group communication.

Once a group media communication session is established, a conference ID may be assigned to the established session and CDs 104 and 106 and group communication server (GCS) 102 may exchange media and signaling messages using the assigned conference ID. In one embodiment, media may be exchanged between the participating CDs and the group communication server by using real-time protocol (RTP) over UDP. The signaling messages may also be exchanged by using a signaling protocol over UDP.

Group communication system 100 performs several different functions in order to operate group communication services. The functions that relate to the user side include user registration, group communication initiation, group communication termination, sending messages to group participants, late join to a group communication, talker arbitration, adding members to a group, removing members from a group, unregistering a member, and user authentication. The functions that relate to system preparation and operation include administration and provisioning, scalability, and reliability.

Figure 2:
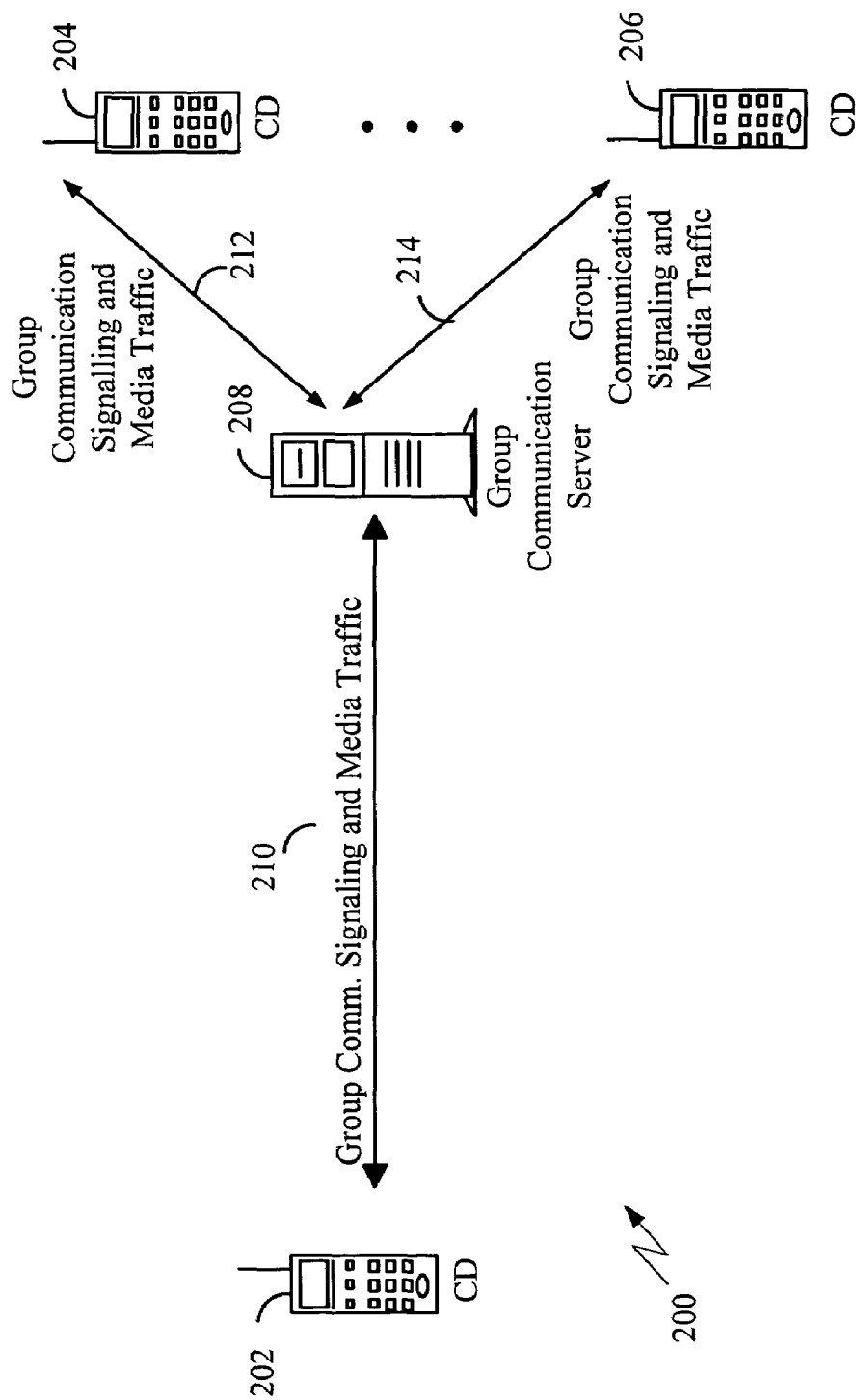
FIG. 2 illustrates how several communication devices interact with a group communication server.

FIG. 2 illustrates a group communication arrangement 200 for showing how CDs 202, 204, and 206 interact with a group communication server 208. Multiple group communication servers may be deployed as desired for large-scale groups. A user may input her desire to a CD 202, 204, 206 to initiate a communication session for exchanging communication media, e.g., data, voice, image, and/or video, with one or more CDs. In one embodiment, the user may first invite the target users(s) before starting to communicate media, by pushing an "invite" or a PTT button on a CD.

In FIG. 2, when CD 202 has permission to transmit media to other members of the group, CD 202 is known as the originator and may transmit media over an established channel. When CD 202 is designated as the originator, the remaining participants, CD 204 and CD 206, may not be permitted to transmit media to the group. Accordingly, CD 204 and CD 206 are designated as targets. As described above, CDs 202, 204, and 206 are connected to group communication server 208, using at least one channel. In one embodiment, channels 210, 212, and 214 may include a session initiation protocol (SIP) channel, a media-signaling channel, and a media traffic channel.

Figure 3:
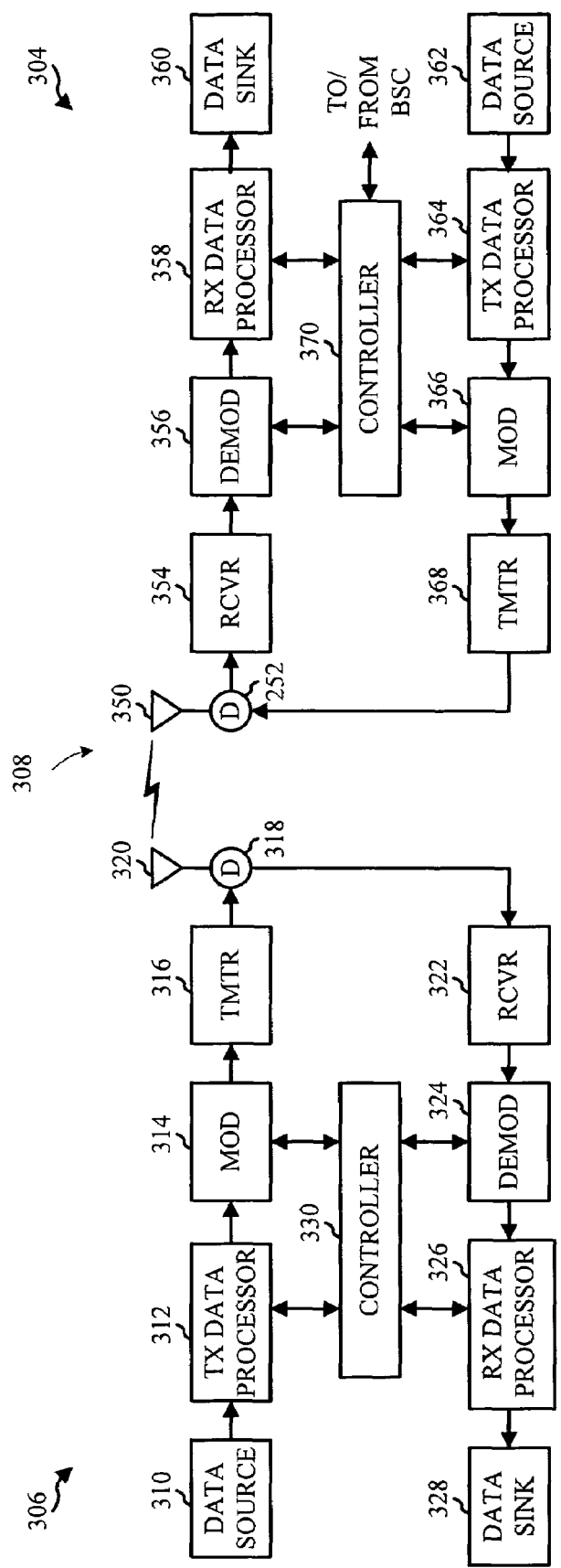
FIG. 3 illustrates one embodiment for an infrastructure for implementing various disclosed embodiments.

FIG. 3 is a simplified block diagram of one embodiment of an infrastructure including a base station/base station controller (BS/BSC) 304 and a communication device 306, which are capable of implementing various disclosed embodiments. For a particular media communication, voice, data, packet data, and/or alert messages may be exchanged between BS/BSC 304 and communication device 306, via an air interface 308. Various types of messages may be transmitted, such as messages used to establish a communication session between the base station and the communication device, registration and paging messages, and messages used to control a data transmission (e.g., power control, data rate information, acknowledgment, and so on). Some of these message types are described in further detail below.

For the reverse link, at communication device 306, voice and/or packet data (e.g., from a data source 310) and messages (e.g., from a controller 330) are provided to a transmit (TX) data processor 312, which formats and encodes the data and messages with one or more coding schemes to generate coded data. Each coding scheme may include any combination of cyclic redundancy check (CRC), convolutional, turbo, block, and other coding, or no coding at all. The voice, packet data, and messages may be coded using different schemes, and different types of messages may be coded differently.

The coded data is then provided to a modulator (MOD) 314 and further processed (e.g., covered, spread with short PN sequences, and scrambled with a long PN sequence assigned to the communication device). The modulated data is then provided to a transmitter unit (TMTR) 316 and conditioned (e.g., converted to one or more analog signals, amplified, filtered, and quadrature modulated) to generate a reverse link signal. The reverse link signal is routed through a duplexer (D) 318 and transmitted via an antenna 320 to BS/BSC 304.

At BS/BSC 304, the reverse link signal is received by an antenna 350, routed through a duplexer 352, and provided to a receiver unit (RCVR) 354. Alternatively, the antenna may be part of the wireless operator network, and the connection between the antenna and the BS/BSC may be routed through the Internet. BS/BSC 304 may receive media information and alert messages from communication device 306. Receiver unit 354 conditions (e.g., filters, amplifies, down converts, and digitizes) the received signal and provides samples. A demodulator (DEMOD) 356 receives and processes (e.g., despreads, decovers, and pilot demodulates) the samples to provide recovered symbols. Demodulator 356 may implement a rake receiver that processes multiple instances of the received signal and generates combined symbols. A receive (RX) data processor 358 then decodes the symbols to recover the data and messages transmitted on the reverse link. The recovered voice/packet data is provided to a data sink 360 and the recovered messages may be provided to a controller 370. Controller 370 may include instructions for receiving and sending information, receiving and sending responses to messages, requesting media encryption keys (MEKs), transitioning from a current MEK to a new MEK, setting timers for requesting a new MEK and transitioning thereto, identifying the targets, locating the targets, determining restrictions imposed on the originator and the targets, determining whether the originator and/or the targets are registered in the group communication system and/or whether at least one target accepts to receive media, and buffering media. The processing by demodulator 356 and RX data processor 358 are complementary to that performed at remote access device 306. Demodulator 356 and RX data processor 358 may further be operated to process multiple transmissions received via multiple channels, e.g., a reverse fundamental channel (R-FCH) and a reverse supplemental channel (R-SCH). Also, transmissions may be simultaneously from multiple communication devices, each of which may be transmitting on a reverse fundamental channel, a reverse supplemental channel, or both.

On the forward link, at BS/BSC 304, voice and/or packet data (e.g., from a data source 362) and messages (e.g., from controller 370) are processed (e.g., formatted and encoded) by a transmit (TX) data processor 364, further processed (e.g., covered and spread) by a modulator (MOD) 366, and conditioned (e.g., converted to analog signals, amplified, filtered, and quadrature modulated) by a transmitter unit (TMTR) 368 to generate a forward link signal. The forward link signal is routed through duplexer 352 and transmitted via antenna 350 to remote access device 306. Forward link signals include paging signals.

At communication device 306, the forward link signal is received by antenna 320, routed through duplexer 318, and provided to a receiver unit 322. Receiver unit 322 conditions (e.g., down converts, filters, amplifies, quadrature modulates, and digitizes) the received signal and provides samples. The samples are processed (e.g., despreaded, decovered, and pilot demodulated) by a demodulator 324 to provide symbols, and the symbols are further processed (e.g., decoded and checked) by a receive data processor 326 to recover the data and messages transmitted on the forward link. The recovered data is provided to a data sink 328, and the recovered messages may be provided to controller 330. Controller 330 may include instructions for receiving and sending information, receiving and sending responses to messages, requesting media encryption keys (MEKs), transitioning from a current MEK to a new MEK, setting timers for requesting a new MEK and transitioning thereto, buffering media, transmitting media to a group communication server, and granting permission to the originator to deliver media.

Confidentiality of media communication may be maintained by encrypting the vocoder frames bundled in each media packet. In one embodiment, encryption may be performed via the Rijndael (AES) algorithm in 128-bit blocks. Media encryption generally requires three components: a media encryption key (MEK), an encryption counter value (or State-vector), and a vocoder frame to be encrypted.

The MEK may be a 128-bit value that may be known only to the clients participating in a specific media communication session. This value may be obtained from a secure key server (SKS) via over-the-air message in a secure way. A new MEK may be requested from the SKS each time a client attempts to engage in a media communication session. For security, MEKs may be stored persistently on the client's communication device if a secure storage is available on the client's communication device.

The counter value may be encrypted with the MEK via the Rijndael algorithm to produce a 128-bit encryption mask. Vocoder frames may be encrypted by XORing the vocoder data with the encryption mask in 128-bit blocks. Likewise, vocoder frames may be decrypted by XORing the vocoder data with the same mask value used in the original encryption. The encryption counter may be unique for each block encrypted with a specific MEK.

Each unique MEK is associated with a time-to-live (TTL) value. The TTL specifies the time at which the current MEK expires and would no longer be valid. When the TTL of a current MEK expires, the current MEK may be retired in favor of a new MEK with a new TTL value. This requires a mechanism to handle the transition from one MEK to another without negatively impacting the encryption and/or decryption of the media stream.

TTL values may be specified in milliseconds and transitioned with media packet granularity. If the TTL value of a MEK expires for a vocoder frame that is not the first frame in a media packet, the MEK may not expire until all vocoder frames have been encrypted and/or decrypted in the current packet. This implies that each client may possess two MEKs, the current MEK and the new MEK.

The current MEK is the key that is currently valid and is used to encrypt and/or decrypt vocoder frames during an ongoing media communication session. The new MEK is the MEK that will be used to encrypt and/or decrypt vocoder frames after the TTL of the current MEK has expired.

Due to network delay and other issues, there is no guarantee that the current MEK at all clients engaged in an ongoing communication session expire at precisely the same time. The sender of a media packet may encrypt the vocoder frames with the current MEK just before it expires. By the time a target receives the encrypted media packet, the current MEK may have already transitioned to the new MEK resulting in the media packet being decrypted with the wrong MEK. Therefore, a brief period of uncertainty exists as to which client is using which MEK. This period is referred to as the key transition period (KTP). Upon expiration of KTP, the current MEK may be discarded and the new MEK may become the current MEK. This process is referred to as MEK transition.

The KTP is a predetermined time period initiated by a client during which the client assumes that media packets received could have been encrypted with either the current MEK or the new MEK. Therefore, the client may request a new MEK prior to the start of the KTP to insure that both the current MEK and the new MEK are available for properly decrypting media packets received during KTP. While encrypting, the sender may set a flag, referred to as the MEK indicator flag (MIF), in each media frame to indicate which MEK the sender has used to encrypt the media frame. Each receiver uses the received MIF to determine which MEK, current or new, should be used to decrypt the associated received media frame. KTP is set such that it is assured that all clients, sender and receivers, transition from the current MEK to the new MEK within the KTP. Once the KTP expires, receivers begin decrypting all future media frames using the new MEK.

Figure 4A:
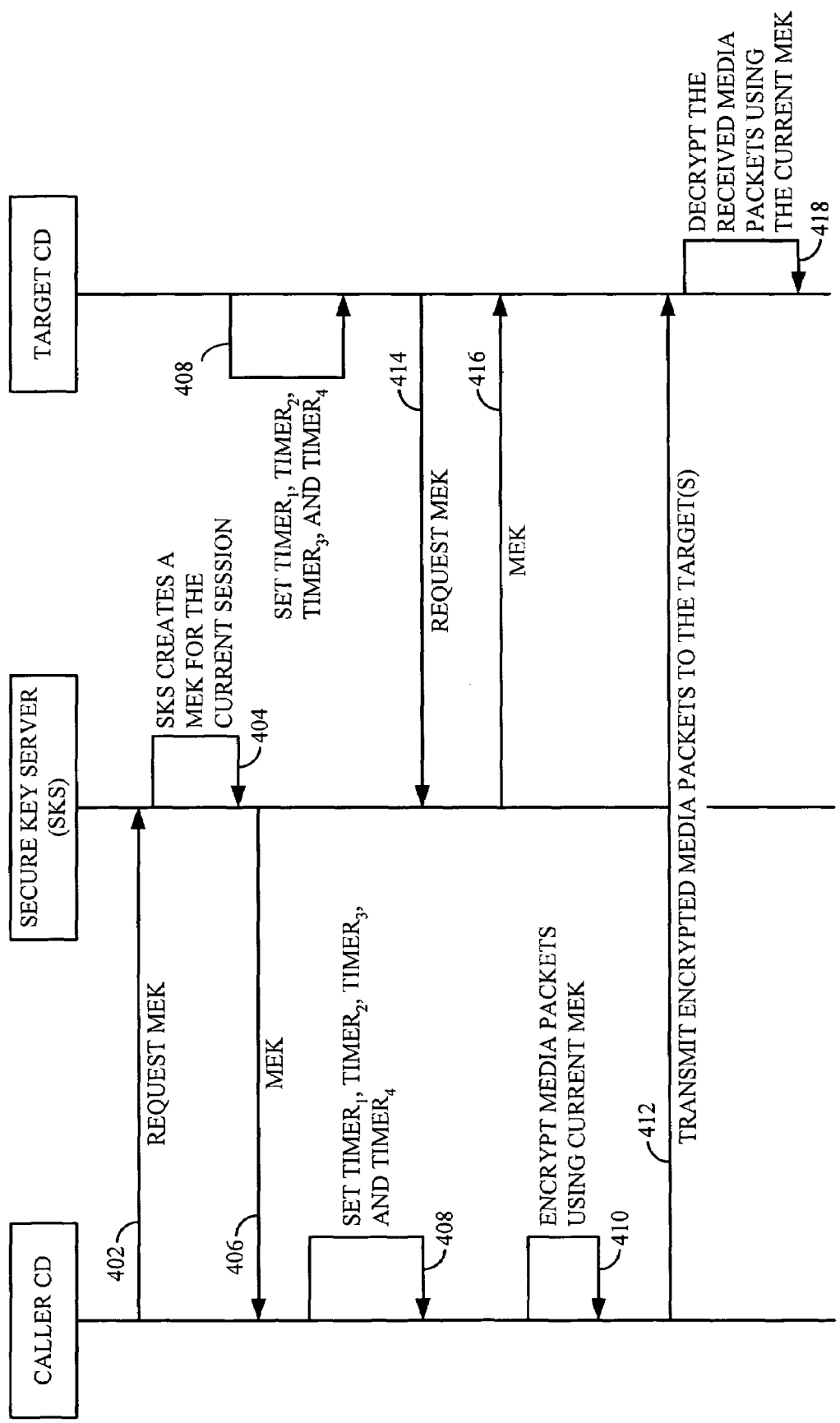
FIGS. 4A, 4B, and 5 illustrate a process for distributing encryption keys during a media communication session.
Figure 4B:
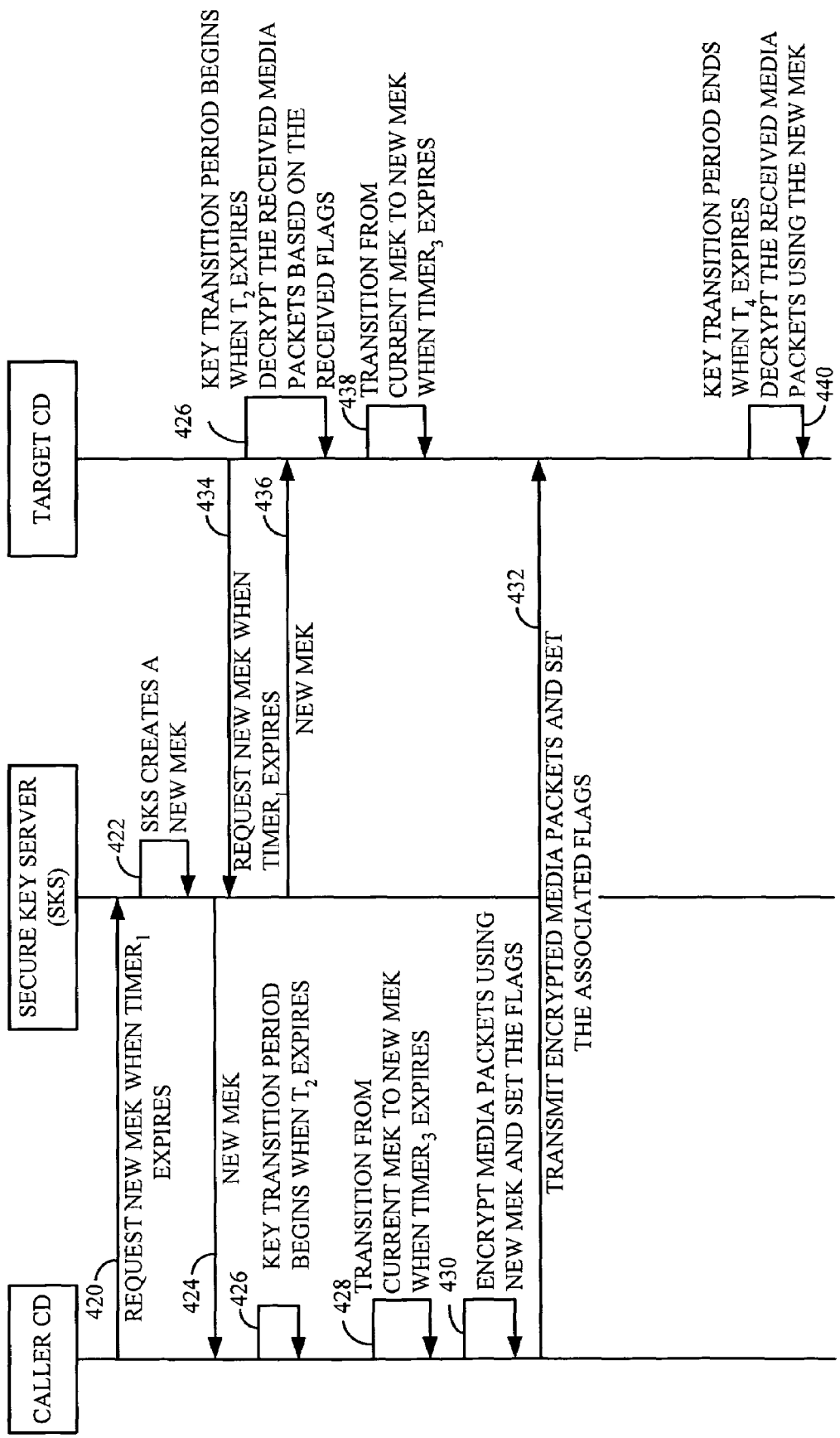
Figure 5:
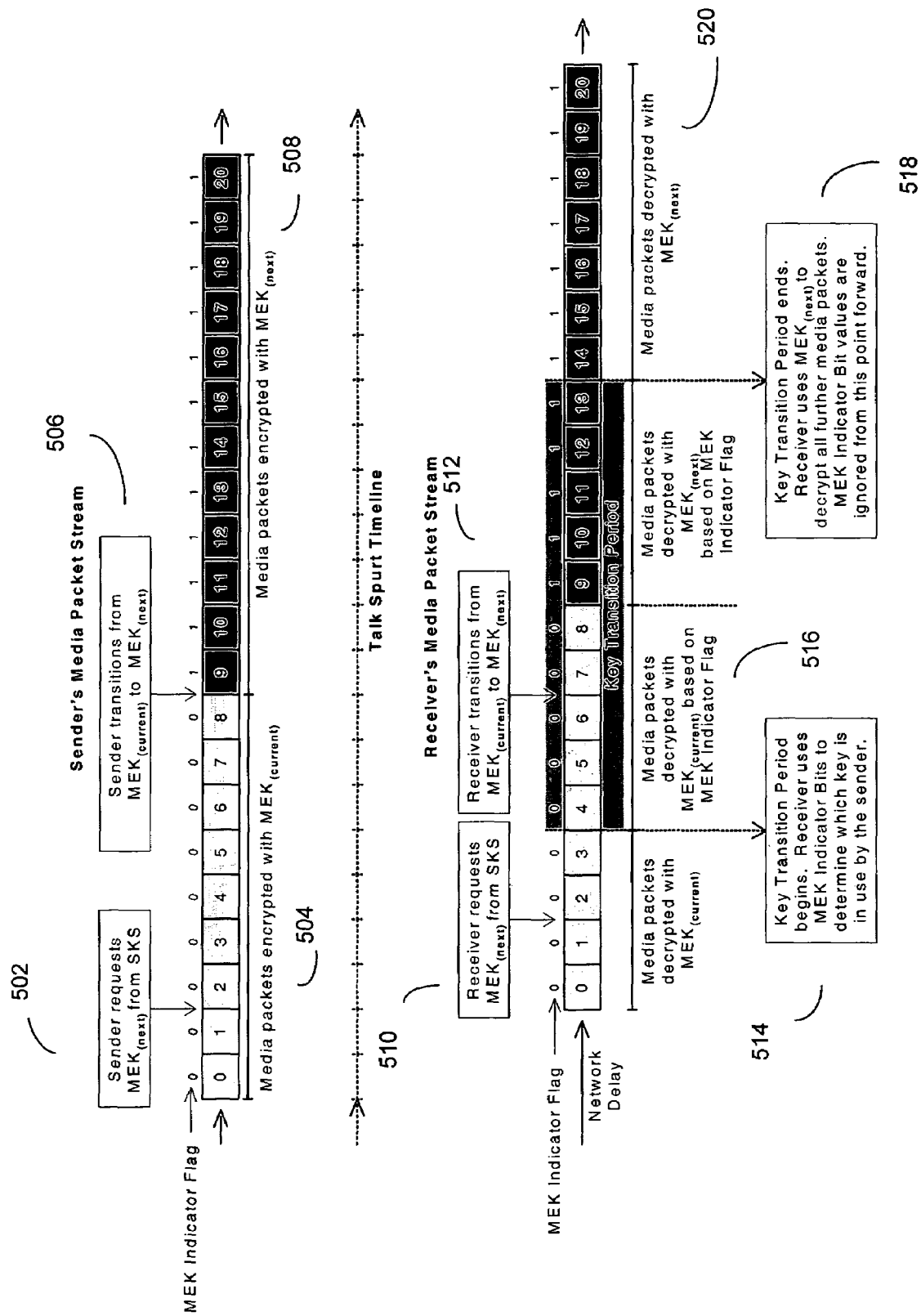

FIG. 4A, FIG. 4B, and FIG. 5 illustrate a process for transitioning dynamic media encryption keys during an ongoing media communication session, according to one embodiment. After the originator selects a member list and presses the PTT button on his or her CD, the group call server (GCS) establishes a media communication session. All users participating in the current communication session may be given a unique conference ID for the current ongoing session.

To encrypt media packets, the originator's CD requests a media communication key (MEK), as shown by 402, from a secure key server (SKS), which may be a part of the GCS or a separate entity, either at the service provider (carrier) side or controlled by the customer sponsoring secure media communication, e.g., Government. The request for the MEK may include, or refer to, the current conference ID.

The SKS creates a MEK for the current media communication session corresponding to the received, or referenced to, conference ID, as shown by 404. The MEK includes a life-to-live timer (TTL) value upon its expiration the MEK expires and would not be valid anymore. The SKS then sends the MEK to the originator's CD, as shown by 406.

Upon receiving the MEK, the originator's and the targets' CDs set four timers, as shown by 408. The first timer is for requesting a new MEK before the current MEK expires. The CDs may reset their respective MIFs to "0" upon requesting a new MEK. The second timer is for initializing the KTP, the third timer is for transitioning from the current MEK to the new MEK, and the fourth timer is used to signal the expiration of the KTP. The originator's CD uses the current MEK to encrypt the media packets, as shown by 410, for transmission to the target(s), as shown by 412.

The other users participating in the current media communication session, e.g., the target(s), request for the MEK, as shown by 414, which request include, or refer to, the same conference ID associated with the current session, and receive the MEK, as shown by 416. When the encrypted media packets arrive at the target(s), the target's CD decrypts the received encrypted media packets using the current MEK, as shown by 418.

Referring to FIG. 4B and FIG. 5, upon expiration of the first timer at the originator's CD during the current communication session, indicating that the current MEK is about to expire, the originator's CD requests a new MEK from the SKS, as shown by 420 and 502. The SKS generates a new MEK, including a new TTL value, as shown by 422, and sends the new MEK to the originator's CD, as shown by 424. The originator's CD continues to encrypt media packets using the current MEK, as shown by 504. The originator's CD sets the MEK identification flag (MIF) to "0," for example, for each encrypted media frame and/or packet to indicate the use of the current MEK in encryption of the media packet.

Upon expiration of the second timer, the KTP begins and the target(s) decrypt the received media using either the current or the new MEK based on the received MIF bits, as shown by 426 and 516.

Upon expiration of the third timer at the originator's CD, indicating the expiration of the current MEK, the originator's CD transitions from the current MEK to the new MEK, as shown by 428, and encrypts media packets using the new MEK, as shown by 430 and 508. The originator's CD sets the MEK identification flag (MIF) to "1," for example, for each encrypted media packet to indicate the use of the new MEK in encryption of the media packets. The encrypted media packets are communicated to the target(s), as shown by 432.

The other users participating in the current media communication session, e.g., the target(s), request for the new MEK, as shown by 434 and 510, which request includes the conference ID associated with the current session, receive the new MEK, as shown in step 436, and transition from the current MEK to the new MEK when their corresponding third timers expire, as shown by 438 and 512.

Due to network delays and other factors, there is no guarantee that the current MEK expires at precisely the same time in all CDs engaged in the current session. The sender of a media packet may encrypt the media packets (vocoder frames) with the current MEK just before it expires. By the time a target receives the media packet, it may have already transitioned to a new MEK, which may result in some media packets being decrypted with the wrong MEK. Therefore, a brief period of uncertainty exists as to which user's CD is using which MEK. This is referred to as the key transition period (KTP).

The KTP is a time period, which may be initiated by each participating CD, during which the CD assumes that a media packet received could have been encrypted using either the current MEK or new MEK. Therefore, the CD requests the new MEK prior to the start of the KTP to insure that both current and new MEKs are available to decrypt a media packet received during KTP. While encrypting, the sender sets a MEK indicator flag (MIF) in each media frame to indicate which MEK the sender has used to encrypt the media frame. Each receiver uses the received MIF to determine which MEK should be used to decrypt the received encrypted media packet with the appropriate MEK. KTP is programmed to assure that all CDs, sender and receivers, transition from the current MEK to the new MEK within the KTP. Once the KTP expires, receivers begin decrypting media packets using the new MEK.

After a KTP begins, as shown by 514, and an encrypted media packet arrives at the target(s) during the KTP, the target's CD decrypts the received encrypted media packet based on the corresponding MIF; using either the current MEK or the new MEK based on whether the MIF is set to "0" or "1," respectively, as shown by 426 and 516. Upon expiration of the KTP, as shown by 518, the target's CD decrypts a received encrypted media packet using the new MEK, as shown by 440 and 520.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method for transitioning encryption keys during an ongoing media communication session between a caller communication device and at least one target communication device, the method comprising:

the target communication device receiving media packets encrypted using a current media key (MEK);

the target communication device decrypting the encrypted media packets using the current MEK;

the target communication device requesting a new MEK from a secure key server (SKS) upon expiration of a first timer indicating that the current MEK is about to expire, the first timer having been set based on a time-to-live (TTL) value assigned by the SKS for the current MEK;

the target communication device receiving the new MEK from the SKS;

transitioning from the current MEK to the new MEK during a key transition period (KTP) initialized upon expiration of second timer which is after the expiration of the first timer, wherein the target communication device;

receives, from the caller communication device, encrypted media packets and a MEK indicator flag (MIF) for each media packet that indicates whether the media packet is encrypted using the current MEK or the new MEK; and decrypts the encrypted media packets using the current MEK or the new MEK selected based on the MIF for each media packet;

after an end of the KTP upon expiration of a fourth timer;

the target communication device receiving, from the caller communication device, media packets encrypted using only the new MEK; and decrypting the encrypted media packets using only the new MEK without regard to the MIF.

2. The method of claim 1, wherein the first timer is set again when the new MEK is received.

3. The method of claim 1, wherein said decrypting the encrypted media packets based on the received MIF begins at the start of the KTP.

4. The method of claim 3, wherein said decrypting the encrypted media packets based on the received MIF ends at the end of the KTP.

5. The method of claim 1, further comprising the target communication device discarding the current MEK after the end of the KTP.

6. A computer-readable medium embodying codes for implementing a method for transitioning encryption keys during an ongoing media communication session between a caller communication device and at least one target communication device, the method comprising:

the target communication device receiving media packets encrypted using a current media key (MEK);

the target communication device decrypting the encrypted media using the current MEK;

the target communication device requesting a new MEK from a secure key server (SKS) upon expiration of a first timer indicating that the current MEK is about to expire, the first timer having been set based on a time-to-live (TTL) value assigned by the SKS for the current MEK;

the target communication device receiving the new MEK from the SKS;

transitioning from the current MEK to the new MEK during a key transition period (KTP) initialized upon expiration of second timer which is after the expiration of the first timer, wherein the target communication device:

receives, from the caller communication device, encrypted media packets and a MEK indicator flag (MIF) for each media packet that indicates whether the media packet is encrypted using the current MEK or the new MEK; and decrypts the encrypted media packets using the current MEK or the new MEK selected based on the MIF for each media packet;

after an end of the KTP upon expiration of a fourth timer:

the target communication device receiving, from the caller communication device, media packets encrypted using only the new MEK; and decrypting the encrypted media packets using only the new MEK without regard to the MIF.

7. The medium of claim 6, wherein the first timer is set again when the new MEK is received.

8. The medium of claim 6, wherein said decrypting the encrypted media packets based on the received MIF begins at the start of the KTP.

9. The medium of claim 8, wherein said decrypting the encrypted media packets based on the received MIF ends at the end of the KTP.

10. The medium of claim 6, further comprising the target communication device discarding the current MEK after the end of the KTP.

11. An apparatus for transitioning encryption keys during an ongoing media communication session with a caller communication device, comprising:

means for receiving media packets encrypted using a current media encryption key (MEK);

means for decrypting the encrypted media using the current MEK;

means for requesting a new MEK from a secure key server (SKS) upon expiration of a first timer indicating that the current MEK is about to expire, the first timer having been set based on a time-to-live (TTL) value assigned by the SKS for the current MEK;

means for receiving the new MEK from the SKS;

means for transitioning from the current MEK to the new MEK, during a key transition period (KTP) initialized upon expiration of second timer which is after the expiration of the first timer, by receiving, from the caller communication device, encrypted media packets and a MEK indicator flag (MIF) for each media packet that indicates whether the media packet is encrypted using the current MEK or the new MEK, and by decrypting the encrypted media packets using the current MEK or the new MEK selected based on the MIF for each media packet;

means for receiving, from the caller communication device, media packets encrypted using only the new MEK; and means for decrypting the encrypted media packets using only the new MEK without regard to the MIF after an end of the KTP upon expiration of a fourth timer.

12. The apparatus of claim 11, wherein the first timer is set again when the new MEK is received.

13. The apparatus of claim 11, wherein said decrypting the encrypted media packets based on the received MIF begins at the start of the KTP.

14. The apparatus of claim 13, wherein said decrypting the encrypted media packets based on the received MIF ends at the end of the KTP.

15. The apparatus of claim 11, further comprising means for discarding the current MEK after the end of the KTP.

16. An apparatus for transitioning encryption key during an ongoing wireless media communication session with a caller communication device, comprising:

a memory unit;

a receiver;

a transmitter; and a processor coupled to the memory unit, the receiver, and the transmitter, the processor being capable of:

decrypting encrypted media packets using a current media encryption key (MEK);

requesting a new MEK from a secure key server (SKS) upon expiration of a first timer indicating that the current MEK is about to expire, the first timer having been set based on a time-to-live (TTL) value assigned by the SKS for the current MEK;

receiving the new MEK from the SKS;

transitioning from the current MEK to the new MEK, during a key transition period (KTP) initialized upon expiration of second timer which is after the expiration of the first timer, by receiving, from the caller communication device, encrypted media packets and a MEK indicator flag (MIF) for each media packet that indicates whether the media packet is encrypted using the current MEK or the new MEK, and by decrypting the encrypted media packets using the current MEK or the new MEK selected based on MEK indicator flag (MIF) for each media packet that indicates whether the media packet is encrypted using the current MEK or the new MEK;

receiving, from the caller communication device, media packets encrypted using only the new MEK; and decrypting the encrypted media packets using only the new MEK after transitioning without regard to the MIF after an end of the KTP upon expiration of a fourth timer.

17. The apparatus of claim 16, wherein the first timer is set again when the new MEK is received.

18. The apparatus of claim 16, wherein said decrypting the encrypted media packets based on the MIF begins at the start of the KTP.

19. The apparatus of claim 18, wherein said decrypting the encrypted media packets based on the MIF ends at the end of the KTP.

20. The apparatus of claim 16, further comprising the processor further being capable of discarding the current MEK after the end of the KTP.

* * * * *